Jan. 8, 1924.
J. L. BOBO
1,480,496
OILLESS BEARING FOR HARNESS ROLLS FOR LOOMS
Filed March 7, 1921
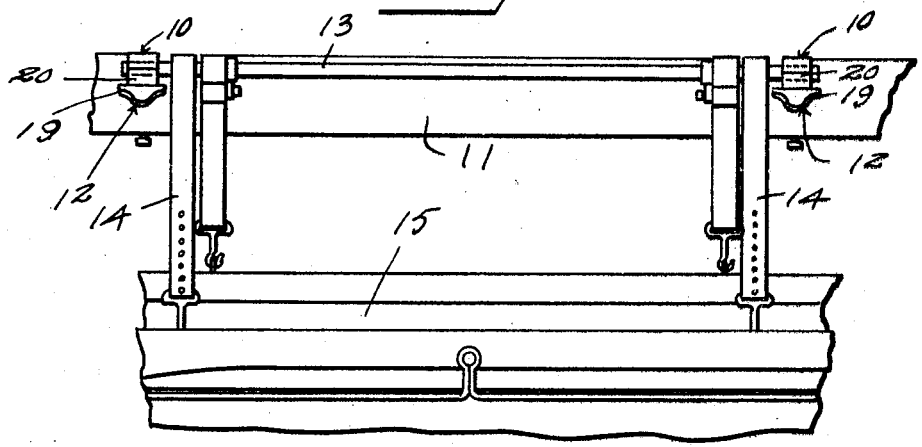
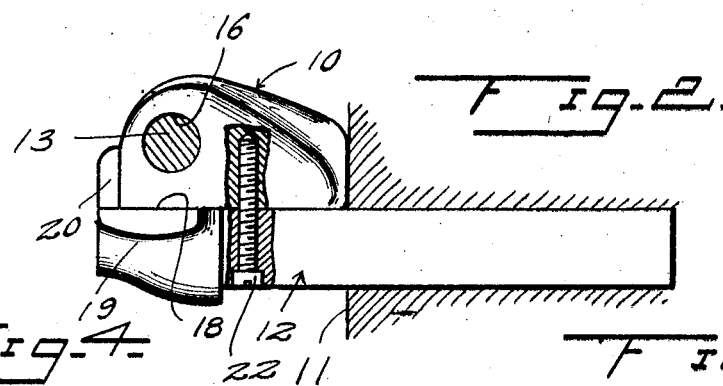
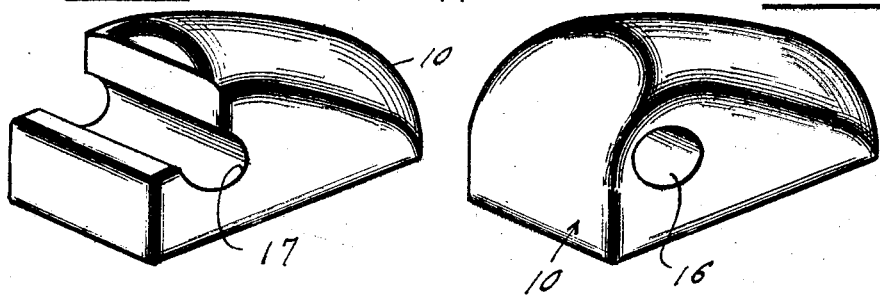
Inventor
J. L. Bobo
By
Attorney Patented Jan. 8, 1924.

1,480,496

UNITED STATES PATENT OFFICE.

JOHN L. BOBO, OF GREENVILLE, SOUTH CAROLINA.

OILLESS BEARING FOR HARNESS ROLLS FOR LOOMS.

Application filed March 7, 1921. Serial No. 450,374.

*To all whom it may concern:*

Be it known that I, JOHN L. BOBO, a citizen of the United States, residing at Greenville, in the county of Greenville and State of South Carolina, have invented certain new and useful Improvements in Oilless Bearings for Harness Rolls for Looms; and I do hereby declare the following to be a full, clear, and exact description of the invention, such as will enable others skilled in the art to which it appertains to make and use the same.

The object of the invention is to provide a harness bearing for looms which may readily be substituted for the metallic bearings with which looms are ordinarily provided and more especially to provide a bearing element for this purpose which is adapted to operate without a supply of oil or other loose lubricant which is objectionable by reason of the fact that the bearings are of necessity located over the fabric which is being woven and any dripping from which falls upon the fabric and unavoidably renders it unfit for commercial use; and with this object in view the invention consists in a construction and combination of parts of which a preferred embodiment is shown in the drawing, wherein:

Figure 1 is a front view of a portion of a loom fitted with harness bearings constructed in accordance with the invention.

Figure 2 is a vertical sectional view of the same showing one of the harness bearings in side elevation in its operative position.

Figures 3 and 4 are detail enlarged perspective views of bearing blocks respectively having closed and open bearings which may be interchangeably or selectively used in this connection.

The device embodying the invention consists essentially of a hard wood bearing block 10 which is prepared for use by thoroughly saturating the same in oil under such conditions as to secure a thorough impregnation thereof, to the end that the surfaces of the block permanently maintain an oily or lubricated condition for contact with any object which may be mounted thereon. The device is shown in connection with a loom of which the harness frame is indicated at 11, carrying the bracket arms 12 which extend forward over the body of the loom for the support of the harness rods 13 with which are engaged the straps 14 which uphold the harness 15. The bearing blocks 10 constitute the mountings for the rollers 13 which extend parallel with the harness frame and harness and for this purpose are provided with bearings 16 of which the surfaces by reason of the special treatment of the porous material of which the blocks are constructed are permanently lubricated and do not require the application of oil or other lubricant which can by any possibility drop upon the harness or upon the material which is being woven.

In Figure 3 the bearing block is provided with a complete or closed bearing formed by boring the block to provide a channel of the required diameter to receive the rod 13, while in the modified construction shown in Figure 4 the bearing 17 is half-round or open. Closed and open bearings may be used interchangeably in this connection, preference being given to one or the other according to the conditions under which the loom is used.

These bearing blocks may be readily substituted for the ordinary metal bearings with which the bracket arms 12 are usually provided, merely by cutting or milling the metal bearings therefrom and then placing the wooden bearing blocks on seats 18 constituting the upper flat surfaces of the heads 19 which primarily constituted portions of the metal bearings. These seats are preferably provided at their forward edges with upstanding flanges 20 also primarily forming parts of the metal bearings which are allowed to remain when the bearing is cut away, and the block is secured to the seat, in contact at its forward end with said flange or ear, by means of a screw 22 extended upward through a perforation in the shank of the bracket arm.

Obviously these wooden bearing blocks may be replaced with facility when required, but in practice will be found to wear satisfactorily as compared with metal bearings, by reason of the uniform and efficient lubrication thereof incident to the saturation of the material in the course of the preparation thereof.

Having thus described the invention, what I claim is:—

1. In a harness mechanism for looms, a supporting arm for the harness rod secured to and extending hornzontally from the harness frame, said arm having an upper flat surface and provided at its outer end with a flange extending upwardly beyond said surface, and an oil impregnated block secured upon said flat surface between and engaging said flange and frame and having a bearing for said rod.

2. In a harness mechanism for looms, a supporting arm for the harness rod secured to and extending horizontally from the harness frame, and an oil impregnated block secured upon said supporting arm and having a bearing for said rod.

In testimony whereof I affix my signature in presence of two witnesses.

JOHN L. BOBO.

Witnesses:
   JAMES B. ABBOTT,
   G. L. MOORE.